United States Patent
Fujita

(10) Patent No.: US 9,367,147 B2
(45) Date of Patent: Jun. 14, 2016

(54) STICK TYPE INPUT DEVICE ATTACHMENT STRUCTURE, STICK TYPE INPUT DEVICE CAP, STICK TYPE INPUT DEVICE, INFORMATION PROCESSING TERMINAL APPARATUS, AND STICK TYPE INPUT DEVICE ATTACHMENT METHOD

(71) Applicant: Kumpei Fujita, Kyoto (JP)

(72) Inventor: Kumpei Fujita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 468 days.

(21) Appl. No.: 13/937,682

(22) Filed: Jul. 9, 2013

(65) Prior Publication Data

US 2014/0154002 A1    Jun. 5, 2014

(30) Foreign Application Priority Data

Dec. 5, 2012 (JP) ................ 2012-266385

(51) Int. Cl.
*G06F 3/0338* (2013.01)
*G06F 3/0354* (2013.01)
*A63F 13/20* (2014.01)

(52) U.S. Cl.
CPC ........... *G06F 3/03543* (2013.01); *A63F 13/06* (2013.01); *G06F 3/0338* (2013.01); *A63F 2300/1043* (2013.01); *A63F 2300/204* (2013.01); *Y10T 29/49826* (2015.01); *Y10T 403/70* (2015.01)

(58) Field of Classification Search
CPC ........ H01H 9/04; H01H 25/041; G06F 3/033; G06F 3/0338; G06F 3/0213; G06F 1/169
See application file for complete search history.

(56) References Cited

U.S. PATENT DOCUMENTS

| | | | | |
|---|---|---|---|---|
| 3,188,438 | A * | 6/1965 | Lovasco | H01H 23/146 174/66 |
| 5,701,142 | A * | 12/1997 | Brown | G05G 9/047 345/161 |
| 5,952,628 | A * | 9/1999 | Sato | B60K 37/06 200/4 |
| 6,093,900 | A * | 7/2000 | Wisskirchen | B29C 45/1671 200/298 |
| 6,263,544 | B1 * | 7/2001 | Kudoh | G05G 1/02 16/110.1 |
| 6,360,622 | B1 * | 3/2002 | Shibata | G01L 5/223 345/161 |
| 6,433,777 | B1 * | 8/2002 | Sawyer | G06F 1/1616 345/161 |
| 6,797,896 | B2 * | 9/2004 | Lee | H01H 25/041 200/335 |
| 6,956,180 | B1 * | 10/2005 | Su | G06F 1/1626 200/302.1 |
| 2005/0259073 | A1 | 11/2005 | Hirano et al. | |
| 2010/0110008 | A1 * | 5/2010 | Slotta | G06F 1/1616 345/161 |
| 2010/0124634 | A1 * | 5/2010 | Slotta | G06F 3/0338 428/156 |
| 2014/0225830 | A1 * | 8/2014 | Tamura | G06F 3/03338 345/157 |

FOREIGN PATENT DOCUMENTS

JP    2006-48478    2/2006

* cited by examiner

*Primary Examiner* — Daniel Wiley
(74) *Attorney, Agent, or Firm* — Nixon & Vanderhye P.C.

(57) ABSTRACT

An example stick type input device is attached to a main body portion, includes a columnar operation stick, and is for sensing, using a sensor, a content of an operation performed on the operation stick. With an attachment structure of attaching a cap of the stick type input device to the main body portion, the cap is attached to the operation stick so as to enclose an upper end thereof, and the cap is retained so as to resist against removal from the main body portion.

12 Claims, 2 Drawing Sheets

VIEW OF CROSS SECTION ALONG A-A'

STICK TYPE INPUT DEVICE ATTACHMENT STRUCTURE, STICK TYPE INPUT DEVICE CAP, STICK TYPE INPUT DEVICE, INFORMATION PROCESSING TERMINAL APPARATUS, AND STICK TYPE INPUT DEVICE ATTACHMENT METHOD

CROSS REFERENCE TO RELATED APPLICATION

The disclosure of Japanese Patent Application No. 2012-266385, filed on Dec. 5, 2012, is incorporated herein by reference.

FIELD

The exemplary embodiments described herein relate to stick type input devices, and more specifically, relate to attachment structures or the like for a cap of a pointing stick.

BACKGROUND AND SUMMARY

Hitherto known representative examples of stick type input devices include those that are referred to as a pointing stick. The pointing stick is used on information processing equipment etc., such as personal computers, and is used as a signal input device for determining positions and controlling motion of a cursor or the like on a display screen. Furthermore, a cap formed of an elastic body is sometime attached to an operation stick of the pointing stick for improving operability.

However, in the hitherto known pointing stick described above, the cap is structured such that the cap can be removed from the operation stick to allow, for example, replacing of the cap when it is worn. Therefore, there has been a problem of the cap being detached from the operation stick when an unexpected operation is performed on the pointing stick or when excessive impact is applied on the pointing stick.

Thus, a main object of the embodiments described herein is to provide a stick type input device structure or the like capable of preventing detachment of a cap from an operation stick.

The above described object is achieved by, for example, a configuration described below.

A stick type input device according to the present embodiment is attached to a main body portion, includes a columnar operation stick, and is for sensing, using a sensor, a content of an operation performed on the operation stick. In a structure by which a cap is attached to the stick type input device, the cap is attached to the operation stick so as to enclose an upper end thereof, and is retained so as to resist against removal from the main body portion.

With the configuration described above, since the cap is retained so as to resist against removal from the main body portion, detachment of the cap from the operation stick can be prevented.

In addition, the cap may be formed of an elastic body.

With the above described configuration, since the cap formed of an elastic body is retained so as to resist against removal from the main body portion, detachment from the operation stick can be prevented even when the cap deforms elastically.

Furthermore, the main body portion may include a lock part configured to lock onto one part of the cap on the main body portion.

With the above described configuration, since the lock part of the main body portion locks onto one part of the cap, detachment of the cap from the operation stick can be prevented.

Furthermore, either one of the lock part and the one part of the cap may have a boss part protruding toward the other one, and the other one may have formed thereon a fixing part configured to fix the boss part.

With the above described configuration, since the lock part of the main body portion and the one part of the cap have either one the boss part and the fixing part, and since the boss part and the fixing part are fixed, detachment of the cap from the operation stick can be prevented.

Furthermore, the fixing part may have formed thereon an insertion hole configured to have the boss part inserted therethrough.

With the above described configuration, since the boss part is inserted through the fixing part to have the two fixed, detachment of the cap from the operation stick can be prevented.

Furthermore, the insertion hole may have a gap even after the boss part is inserted therethrough, and the one part of the cap may be movably locked against the main body portion when the boss part is inserted through the insertion hole.

With the above described configuration, the cap is movably locked against the main body portion. With this, the operation stick can be operated through the cap, and detachment of the cap from the operation stick can be prevented.

Furthermore, the cap may be retained so as to resist against removal from the main body portion, by having one part of the cap embedded within the main body portion.

With the above described configuration, since one part of the cap is embedded in the main body portion, the cap is retained so as to resist against removal from the main body portion. As a result, detachment of the cap from the operation stick can be prevented.

Furthermore, the one part of the cap may be embedded within the main body portion such that the one part of the cap and the main body portion are overlapped when frontally viewed from an axis direction of the operation stick.

With the above described configuration, since the one part of the cap is embedded within the main body portion such that the one part of the cap and the main body portion are overlapped, detachment of the cap from the operation stick can be prevented.

Furthermore, the one part of the cap is extended in a direction approximately orthogonal to the axis direction of the operation stick to be embedded within the main body portion.

With the above described configuration, since the one part of the cap is extended in a direction approximately orthogonal to the axis direction of the operation stick so as to be embedded within the main body portion, detachment of the cap from the operation stick can be prevented.

Furthermore, the main body portion may include a base part on which the stick type input device is arranged, and an upper surface part connected to the base part while having a gap between the base part, and the one part of the cap may be embedded within the main body portion by having the one part of the cap embedded in the gap.

With the above described configuration, since the one part of the cap is embedded in the gap between the upper surface part and the base part of the main body portion, the cap is retained so as to resist against removal from the main body portion. As a result, detachment of the cap from the operation stick can be prevented.

Furthermore, the cap may include a circumferential surface part attached on an upper end of the operation stick so as to be fitted thereon, a top surface part blocking an opening on an upper end side of the circumferential surface part, and a flange extending outward from an outer peripheral edge of an opening on a lower end side of the circumferential surface part; and the one part of the cap may be the flange.

With the above described configuration, since the flange extending outward from the outer peripheral edge of the opening at the lower end of the cap is embedded within the main body portion, the cap is retained so as to resist against removal from the main body portion. As a result, detachment of the cap from the operation stick can be prevented.

Furthermore, the cap may include a circumferential surface part attached on an upper end of the operation stick so as to be fitted thereon, a top surface part blocking an opening on an upper end side of the circumferential surface part, and a protruding part protruding outward from a part of an opening on a lower end side of the circumferential surface part in an approximately orthogonal direction with respect to the circumferential surface part; and the one part of the cap may be the protruding part.

With the above described configuration, since the protruding part, protruding outward from a part of the opening at the lower end of the cap in an approximately orthogonal direction with respect to the circumferential surface part, is embedded within the main body portion, the cap is retained so as to resist against removal from the main body portion. As a result, detachment of the cap from the operation stick can be prevented.

Furthermore, the cap may include a circumferential surface part attached on an upper end of the operation stick so as to be fitted thereon, a top surface part blocking an opening on an upper end side of the circumferential surface part, a flange extending outward from an outer peripheral edge of an opening on a lower end side of the circumferential surface part; and a protruding part protruding outward from one side part of the flange in an approximately orthogonal direction with respect to the circumferential surface part; and the one part of the cap may be the flange and the protruding part.

With the above described configuration, since the flange extending outward from the outer peripheral edge of the opening at the lower end of the cap, and the protruding part protruding outward from the one side part of the flange in an approximately orthogonal direction with respect to the circumferential surface part are embedded within the main body portion; the cap is retained so as to resist against removal from the main body portion. As a result, detachment of the cap from the operation stick can be prevented.

Furthermore, the cap may be retained by the main body portion so as to be movable in association with an operation performed on the stick type input device.

With the above described configuration, the cap is movably retained by the main body portion. With this, the operation stick can be operated through the cap, and detachment of the cap from the operation stick can be prevented.

Furthermore, the cap may be irremovably retained by the main body portion.

With the above described configuration, since the cap is irremovably retained by the main body portion, detachment of the cap from the operation stick can be prevented.

Furthermore, although description is provided above using, as an example of the configuration of the present embodiment, an attachment structure for a stick type input device. However, the present embodiment may have a configuration as a cap of a stick type input device as described below. That is, in a stick type input device that is attached to a main body portion, includes a columnar operation stick, and is for sensing, using a sensor, a content of an operation performed on the operation stick; a cap according to the present embodiment may be attached to the operation stick so as to enclose an upper end thereof. In this case, the cap includes an extended part extending in a direction unparallel to an axis direction of the operation stick so as to resist against removal from the main body portion.

With the above described configuration, since the cap has the extended part extending in a direction unparallel to the axis direction of the operation stick so as to resist against removal from the main body portion, detachment of the cap from the operation stick can be prevented.

Furthermore, the extended part may extend in a direction approximately orthogonal to the axis direction of the operation stick.

With the above described configuration, since the cap has the extended part extending in a direction approximately orthogonal to the axis direction of the operation stick such that the cap resists against removal from the main body portion, it is possible to prevent detachment of the cap from the operation stick.

Furthermore, at least one part of the extended part may make contact with at least one part of the main body portion.

With the above described configuration, since the cap is formed so as to resist against removal from the main body portion by having the extended part make contact with the main body portion, it is possible to prevent detachment of the cap from the operation stick.

Furthermore, the extended part may be located at an end portion of the cap.

With the above described configuration, by having the extended part located at an end portion of the cap, the cap is formed so as to resist against removal from the main body portion, and it becomes possible to prevent detachment of the cap from the operation stick.

Although description is provided above using, as examples of the configuration of the exemplary embodiments, an attachment structure for a stick type input device, or a cap of a stick type input device. However, the exemplary embodiments may be a stick type input device, an information processing terminal apparatus, or an attachment method for a stick type input device.

With the exemplary embodiments described above, it is possible to provide a structure of a stick type input device capable of preventing detachment of a cap from an operation stick.

These and other objects, features, aspects and advantages of the present invention will become more apparent from the following detailed description of non-limiting example embodiments when taken in conjunction with the accompanying drawings.

DETAILED DESCRIPTION OF NON-LIMITING EXAMPLE EMBODIMENTS

Figure 1:
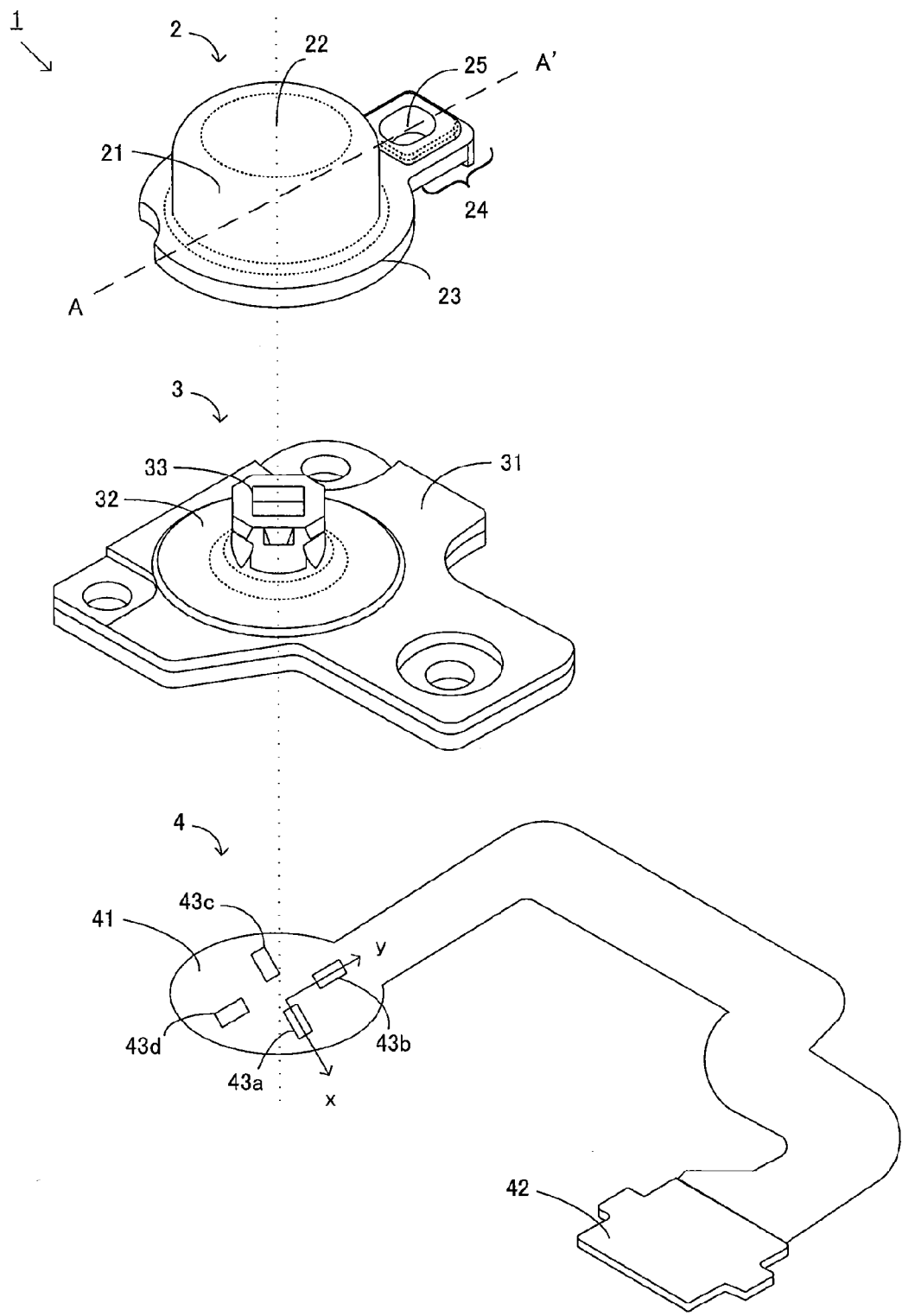
FIG. 1 is an exploded perspective view showing a non-limiting example of a pointing stick 1 according to the present embodiment.

With reference to FIG. 1, a stick type input device (hereinafter, referred to as a pointing stick) according to one embodiment will be described. FIG. 1 is an exploded perspective view showing a pointing stick 1. It should be noted that FIG. 1 is drawn assuming a state in which an attachment structure of the pointing stick 1 is applied to an information processing terminal apparatus (representatively, a portable game apparatus); and, in the figure, the upper side indicates an operation surface direction of the information processing terminal apparatus and the lower side indicates a lower surface direction of the information processing terminal apparatus. With regard to components of the below described pointing stick 1, description of components that are not particularly relevant for describing the present embodiment is omitted or simplified.

The pointing stick 1 is attached to a main body portion 5 of the information processing terminal apparatus (cf. FIG. 2), and functions as an input device for receiving an input made by an operator. As shown in FIG. 1, the pointing stick 1 includes a cap 2, an operation body 3, and a sensor circuit-board 4.

The cap 2 is formed from an elastic body, and is obtained by integrally forming a circumferential surface part 21 formed in an approximately cylindrical form, a top surface part 22 blocking an upper opening of the circumferential surface part 21, a flange 23 (one example of an extended part extending outward) extending outward (specifically, in an approximately orthogonal direction with respect to an axis direction of the operation body 3) from an outer peripheral edge of an opening at a lower end side of the circumferential surface part 21, and a plate-like protruding part 24 protruding further outward (i.e., in an approximately orthogonal direction of the circumferential surface part 21) from one part of the flange 23. On the protruding part 24, an insertion hole 25 formed so as to have inserted therethrough a boss part 54 of the main body portion 5 described later. On the upper surface of the top surface part 22, an operation part (not shown) for receiving an operation by the operator is formed. Although details will be provided later, the cap 2 is retained so as to resist removal from the main body portion 5, by having the flange 23 and the protruding part 24 embedded in the main body portion 5. It should be noted that, as the elastic body of the cap 2, a highly durable material that is unlikely to wear is selected.

The operation body 3 is formed from a resin, a heat-resistant ceramic material, or the like, and is obtained by integrally forming a base 31, an approximately circular pedestal part 32 formed on the base 31, and a columnar operation stick 33 described above formed so as to stand upright on the pedestal part 32. It should be noted that the operation body 3 is not limited to that formed from the above described material, and may be formed from, for example, an insert component of a metal and a resin.

The sensor circuit-board 4 is formed from a flexible resin film or the like, and, has, on one end thereof, an approximately circular base end 41 fixed on the rear surface of the operation body 3 so as to correspond to the position of the pedestal part 32 of the operation body 3. Furthermore, a connector 42 is provided on the other end of the sensor circuit-board 4.

On the base end 41 of the sensor circuit-board 4, strain sensors 43 (43a to 43d) including thick-film or thin-film resistors are formed. The base end 41 on which the strain sensors 43 is formed is adhered and fixed at the position of the rear surface of the pedestal part 32 on the operation body 3 having the operation stick 33 formed thereon. Therefore, when the operation stick 33 is tilted, the strain sensors 43 disposed at the lower part of the operation stick 33 is subjected to compressive force acting in the tilt direction of the operation stick 33 and tensile force acting in the opposite direction of the tilt direction of the operation stick 33. Furthermore, when the strain sensors 43 is subjected to compressive force, its resistance value becomes lower, and when strain sensors 43 is subjected to tensile force, its resistance value becomes higher. Furthermore the strain sensors 43 are connected to a detection circuit (not shown) of the sensor circuit-board 4. The detection circuit detects a change of resistance in a strain sensor, converts it to an electrical signal, and outputs a detected value obtained by the strain sensors 43 to a CPU (not shown) via the connector 42. Therefore, when the strain sensors 43 are disposed in the positive direction (strain sensor 43a) and the negative direction (strain sensor 43c) of the x-axis shown in FIG. 1, and in the positive direction (strain sensor 43b) and the negative direction (strain sensor 43d) of the y-axis orthogonal to the x-axis, it is possible to detect signals of pressing force (magnitude of tilting) in four direction acting on the operation stick 33.

The cap 2 is attached to the upper end of the operation stick 33 of the operation body 3 to which the sensor circuit-board 4 is adhered and fixed. Specifically, the cap 2 has a square pillar shaped hollow part formed by the cylindrical circumferential surface part 21 and the top surface part 22. Since the cap 2 is formed from an elastic body, the hollow part can elastically deform. The internal diameter of the hollow part is set to be smaller than a minimum outer diameter of the operation stick 33. Therefore, the cap 2 can be press-fitted on the operation stick 33 utilizing elasticity of the cap 2, and the circumferential surface part 21 is pressed and fitted on the operation stick 33 so as to be attached and fitted on the upper end of the operation stick 33. The pointing stick 1 formed as described above functions as an input device when the operation stick 33 is tilted through an operation performed on an operation part (not shown) of the cap 2 by an operator, and when magnitude of the tilt is sensed in accordance with an amount of strain on the strain sensors 43 provided on the lower part of the operation stick 33.

Figure 2:
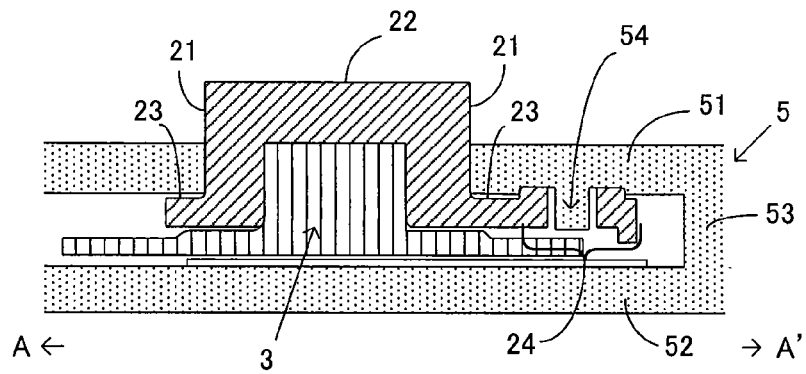
FIG. 2 is a cross sectional view showing a non-limiting example of the pointing stick 1 according to the present embodiment.
Figure 3:
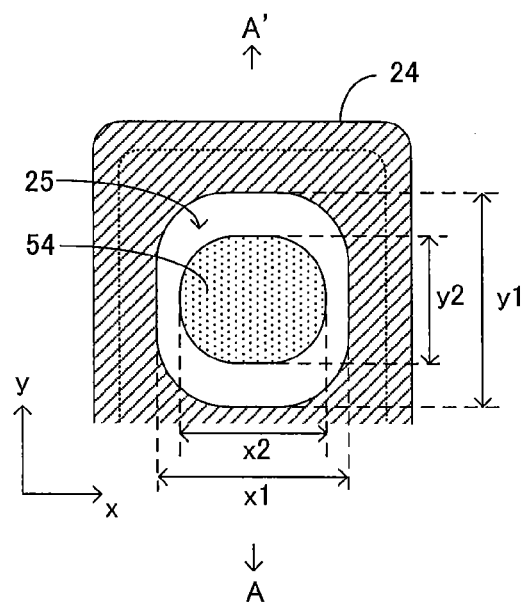
FIG. 3 is a plan view showing a non-limiting example of a protruding part 24 according to the present embodiment.

Next, the structure in which the pointing stick 1 is attached to the main body portion 5 will be described using FIG. 2 and FIG. 3. FIG. 2 is a view of a cross section along line A-A' shown in FIG. 1 regarding the pointing stick 1 attached to the main body portion 5, and FIG. 3 is a plan view of the protruding part 24.

As shown in FIG. 2, the main body portion 5 includes a plate-like upper surface part 51 and a plate-like base part 52. The upper surface part 51 and the base part 52 are connected at parts thereof by a connecting portion 53, and a gap is provided between the upper surface part and the base part. It should be noted that the upper surface part 51 and the base part 52 may be connected with a screw or the like, and connection through the connecting portion 53 is merely one example. In addition, the columnar boss part 54 is formed at one part of the upper surface part 51 so as to protrude toward the base part 52. The boss part 54 is disposed on the upper surface part 51 at a position where an axis line of the insertion hole 25 and an axis line of the boss part 54 essentially match.

The pointing stick 1 is arranged at a predetermined position of the base part 52. In addition, the upper surface part 51 is arranged such that one part thereof is positioned right above the flange 23. Therefore, the flange 23 and the protruding part 24 protruding from the flange 23 in an approximately orthogonal direction of the circumferential surface part 21 are embedded within a gap generated between the upper surface part 51 and the base part 52. As a result, even when a force is applied to the cap 2 in a direction causing detachment thereof from the operation stick 33 (i.e., a force applied upward in FIG. 2), the cap 2 is prevented from being detached from the operation stick since a downward force (reaction) is generated due to the upper surface part 51 disposed right above the flange 23 of the cap 2 making contact with cap 2 (the flange 23) to which the upward force is applied. In other words, one part (the flange 23 and the protruding part 24) of the pointing stick 1 is embedded within (in a gap of) the main body portion 5. More specifically, when the operation body 3 is frontally viewed from its axis direction, one part of the cap 2 is embedded such that one part (the flange 23 and the protruding part 24) of the cap 2 is overlapped with one part (the upper surface part 51) of the main body portion 5. With this, the cap 2 is retained so as to resist against removal from the main body portion 5. It should be noted that, since the cap 2 is not directly adhered to the upper surface part 51 and the base part 52, the cap 2 is retained in a manner movable with respect to the main body portion 5. Therefore, by operating the operation part of the cap 2, the operation stick 33 can be operated through the cap 2.

In addition, the protruding part 24 is locked onto the upper surface part 51 by having the boss part 54 protruding from the upper surface part 51 inserted through the insertion hole 25 of the protruding part 24. Therefore, as a result of the protruding part 24 having the insertion hole 25 functioning as a fixing part for fixing the boss part 54, and the upper surface part 51 having the boss part 54 functioning as a lock part for locking onto the protruding part 24; even when a force is applied to the cap 2 in a direction causing detachment thereof from the operation stick 33 (i.e., a force applied upward in FIG. 2), the cap 2 is prevented from being detached from the operation stick 33 by having the protruding part 24 of the cap 2 locked with respect to the upper surface part 51. Thus, in the pointing stick 1 of the present embodiment, one part (the flange 23 and the protruding part 24) of the cap 2 attached to the operation stick 33 is embedded inside the main body portion 5, and one part (the protruding part 24) of the cap 2 is locked with respect to the main body portion 5 (the upper surface part 51). As a result, even when the cap 2 formed of an elastic body elastically deforms due to having unexpected force applied thereto, the cap 2 is retained so as to resist against removal from the main body portion 5.

Next, the structure in which the protruding part 24 is locked onto the boss part 54 will be described using FIG. 3. As shown in FIG. 3, the insertion hole 25 is formed on the protruding part 24, and the axis line of the insertion hole 25 and the axis line of the boss part 54 essentially match. In addition, when the maximum diameter of the insertion hole 25 in the x-axis direction is x1, when the maximum diameter of the insertion hole 25 in the y-axis direction is y1, when the maximum diameter of the boss part 54 in the x-axis direction is x2, and when the maximum diameter of the boss part 54 in the y-axis direction is y2; the size relation among these diameters are x1>x2 and y1>y2. Thus, the insertion hole 25 has a gap (white portion shown in FIG. 3) even after the boss part 54 is inserted therethrough. With this, although the protruding part 24 is locked with respect to the boss part 54 (i.e., with respect to the main body portion 5), the protruding part 24 has slack enabling movement thereof. Thus, the cap 2 is movably retained by the main body portion 5. Furthermore, even when tensile force is applied to the protruding part 24 in cases where the cap 2 is operated to cause the cap 2 formed of an elastic body to elastically deform, since the protruding part 24 is movable with respect to the boss part 54, it is possible to prevent the protruding part 24 from breaking due to having excessive force applied thereto. It should be noted that, in FIG. 3, as one example, the above described gap is designed such that its y-axis direction is larger than its x-axis direction. With such a design, by designing the y-axis direction to be a direction to which an operation is performed more easily (for example, up-down direction or right-left direction), it is possible to prevent further excessive force to be applied to the protruding part 24.

As describe above, with the attachment structure for the pointing stick 1 of the present embodiment, the cap 2 is retained so as to resist against removal from the main body portion 5. As a result, the cap 2 is irremovably retained on the main body portion 5. Therefore, it is possible to prevent detachment of the cap 2 from the operation stick 33.

It should be noted that the embodiment described above is merely one example, and does not limit the scope of the exemplary embodiments described herein in any way.

Furthermore, in the embodiment described above, although the pointing stick 1 shown in FIG. 1 is described as one example, the exemplary embodiments are not limited to that as long as the cap 2 of the pointing stick 1 is retained so as to resist against removal from the main body portion 5.

Furthermore, in the embodiment described above, as shown in FIG. 1, the flange 23 is formed on the cap 2, and the protruding part 24 is formed from one part of the flange 23. However, it is also possible to not form the flange 23 on the cap 2, but to form the protruding part 24 at one part of the lower end of the circumferential surface part 21. By having the protruding part 24 locked onto the boss part 54 in such manner, the cap 2 is retained so as to resist removal from the main body portion 5.

Furthermore, in the embodiment described above, the protruding part 24 having the insertion hole 25 functions as a fixing part for fixing the boss part 54, and the upper surface part 51 having the boss part 54 functions as a lock part for locking onto the protruding part 24. However, the boss part 54 may be protruded toward the upper surface part 51 from the protruding part 24 of the cap 2, and the insertion hole 25 may be formed on the upper surface part 51 for fixing the boss part 54.

Furthermore, in the embodiment described above, although the flange 23 is formed extending (as an extension) outward in an approximately orthogonal direction of the axis direction of the operation body 3, the direction is not limited to the approximately orthogonal direction as long as it is a direction unparallel to the axis direction of the operation body 3.

Furthermore, the shape of the cap 2 or the like described in the embodiment described above is merely one example, and it is needless to say that the cap 2 or the like can be attained from other shapes.

While certain exemplary embodiments have been described in detail, the foregoing description is in all aspects illustrative and not restrictive. It will be understood that numerous other modifications and variations can be devised.

What is claimed is:

1. An information processing apparatus comprising:
   a stick type input device, the stick type input device being attached to a main body portion, including a columnar operation stick, and being configured to sense, using a sensor, an operation performed on the columnar operation stick,
   a cap attached to the columnar operation stick so as to enclose an upper end of the columnar operation stick, wherein
   the cap includes an extended part extending in a direction transverse to an axis defined by the columnar operation stick,
   the extended part includes a hole,
   the main body portion includes a fixed boss, and
   the hole and the fixed boss are mated together so as to resist against removal of the cap from the stick type input device and the main body portion.
2. The information processing apparatus according to claim 1, wherein the cap is formed of an elastic body.

3. The information processing apparatus according to claim 1, wherein:
the hole is sized to provide a gap around the fixed boss; and
the extended part is movable with respect to the main body portion while the fixed boss is inserted in the hole.

4. The information processing apparatus according to claim 1, wherein the extended part is embedded within the main body portion.

5. The information processing apparatus according to claim 4, wherein the extended part is embedded within the main body portion such that the extended part and the main body portion are overlapped when viewed parallel to the axis.

6. The information processing apparatus according to claim 4, wherein the extended part is extended approximately orthogonal to the axis.

7. The information processing apparatus according to claim 4, wherein:
the main body portion includes a base part on which the stick type input device is arranged, and an upper surface part connected to the base part while having a gap between the base part and the upper surface part; and
the extended part is embedded within the gap.

8. The information processing apparatus according to claim 7, wherein:
the cap includes a circumferential surface part and a flange extending outward from an outer peripheral edge of an opening on a lower end side of the circumferential surface part; and
the extended part extends beyond the flange.

9. The information processing apparatus according to claim 1, wherein the cap is retained by the main body portion so as to be movable in association with an operation performed on the stick type input device.

10. The information processing apparatus according to claim 1, wherein the cap is irremovably retained by the main body portion.

11. A stick type input device comprising:
a columnar operation stick attached to a main body portion, and configured to sense an operation performed on the columnar operation stick,
a cap attached to the columnar operation stick so as to enclose an upper end of the columnar operation stick, wherein
the cap includes an extended part extending in a direction transverse to an axis defined by the columnar operation stick,
the extended part includes a through hole that is configured to mate with a fixed boss on the main body portion so as to resist against removal of the cap from the stick type input device and the main body portion.

12. A method of attaching a cap to a stick type input device on a main body portion, the stick type input device including a columnar operation stick, for sensing an operation performed on the columnar operation stick, the method comprising:
attaching the cap to the columnar operation stick so as to enclose an upper end of the columnar operation stick; and
attaching an extended portion of the cap such that a hole on the extended portion is mated with a fixed boss on the main body portion such that the cap is retained so as to resist against removal from the stick type input device and the main body portion.

* * * * *